(12) United States Patent
Iriarte Eleta et al.

(10) Patent No.: US 9,797,381 B2
(45) Date of Patent: Oct. 24, 2017

(54) LIGHTNING PROTECTION SYSTEM WITH INTEGRATED ANTI-ICING SYSTEM FOR WIND TURBINE BLADES

(71) Applicant: GAMESA INNOVATION & TECHNOLOGY, S.L., Sarriguren (Navarra) (ES)

(72) Inventors: Javier Iriarte Eleta, Sarriguren (ES); Irune Moriana Garcia, Sarriguren (ES); Ion Arocena De La Rua, Sarriguren (ES); Inaki Hermosilla Azanza, Sarriguren (ES); Irene Alli Onos, Sarriguren (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 522 days.

(21) Appl. No.: 14/492,678

(22) Filed: Sep. 22, 2014

(65) Prior Publication Data
US 2015/0098823 A1    Apr. 9, 2015

(30) Foreign Application Priority Data
Oct. 3, 2013    (ES) .................................. 201300919

(51) Int. Cl.
*F03D 11/00*    (2006.01)
*F03D 80/40*    (2016.01)
*F03D 80/30*    (2016.01)

(52) U.S. Cl.
CPC .......... *F03D 11/0025* (2013.01); *F03D 80/30* (2016.05); *F03D 80/40* (2016.05); *Y02E 10/72* (2013.01)

(58) Field of Classification Search
CPC ....... F03D 11/0025; F03D 80/30; F03D 80/40
See application file for complete search history.

(56) References Cited

U.S. PATENT DOCUMENTS

| | | | | |
|---|---|---|---|---|
| 6,612,810 B1 * | 9/2003 | Olsen | ...................... | F03D 80/30 415/4.5 |
| 8,258,773 B2 * | 9/2012 | Brnada | .................. | G01R 15/18 324/72 |

FOREIGN PATENT DOCUMENTS

| | | |
|---|---|---|
| DE | 196 21 485 A1 | 3/1998 |
| EP | 1 187 988 B1 | 8/2003 |

OTHER PUBLICATIONS

Espacenet English abstract of DE 196 21 485 A1.

* cited by examiner

Primary Examiner — Ryan J Walters
(74) Attorney, Agent, or Firm — Ladas & Parry LLP

(57) ABSTRACT

Lightning protection system (LPS) with an integrated anti-icing system for wind turbine blades that comprises a smart protection system (10), an integrated IPS characterized by some conductive sheets (13) embedded in the carbon laminate of the wind turbine blade (1), some overvoltage dischargers (11) installed between the conductive sheets (13) of the IPS and the downlead cable (2) for the lightning protection system (LPS) and an external receptor frame (17).

7 Claims, 4 Drawing Sheets

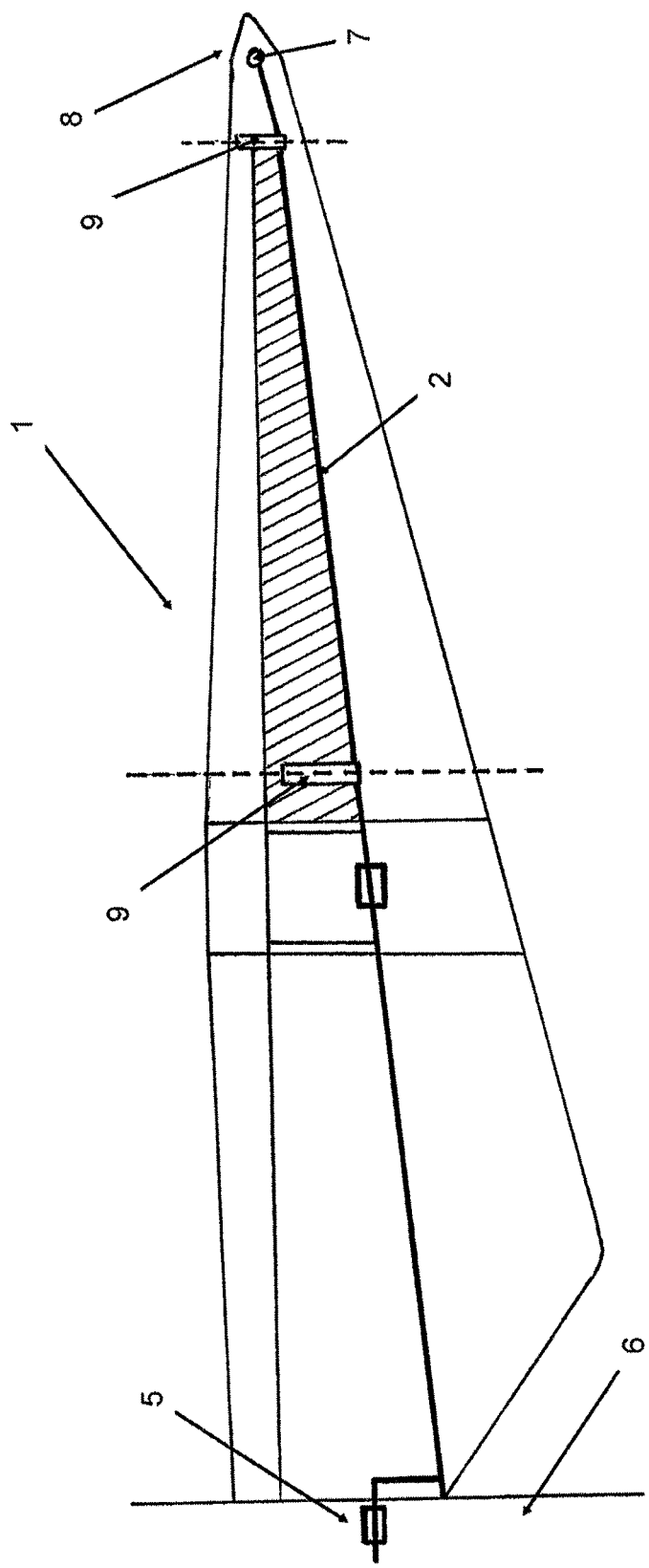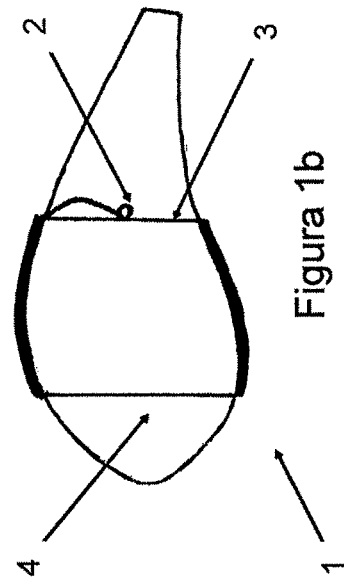
Figura 1a
Figura 1b
PRIOR ART

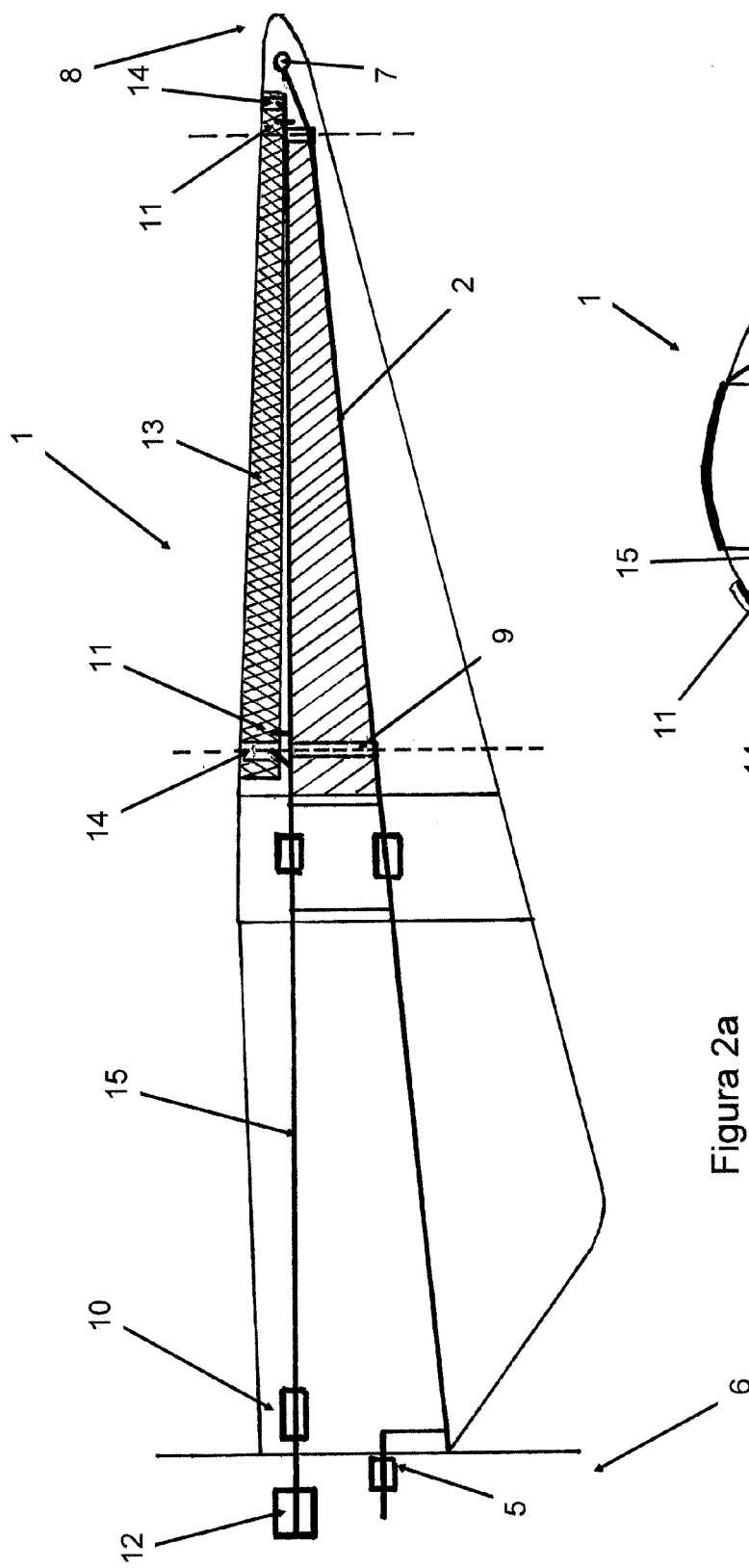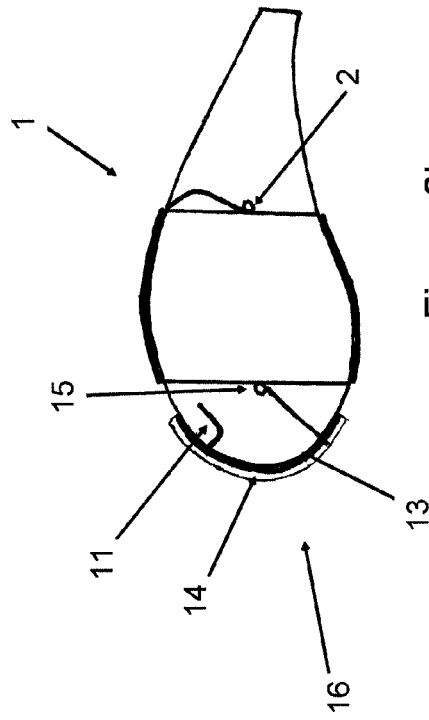
Figura 2a
Figura 2b

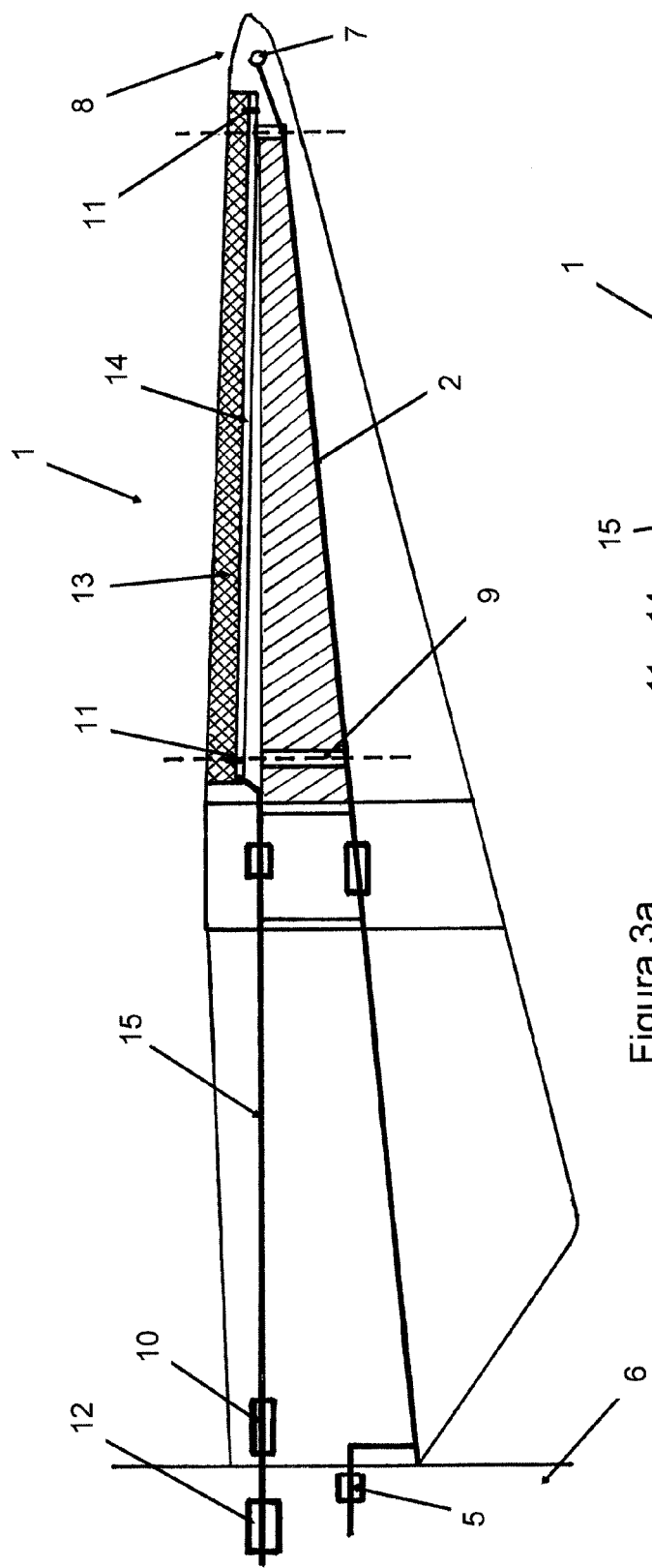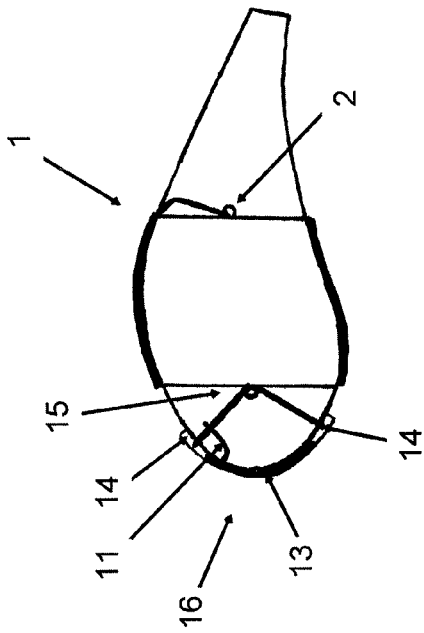
Figura 3a
Figura 3b

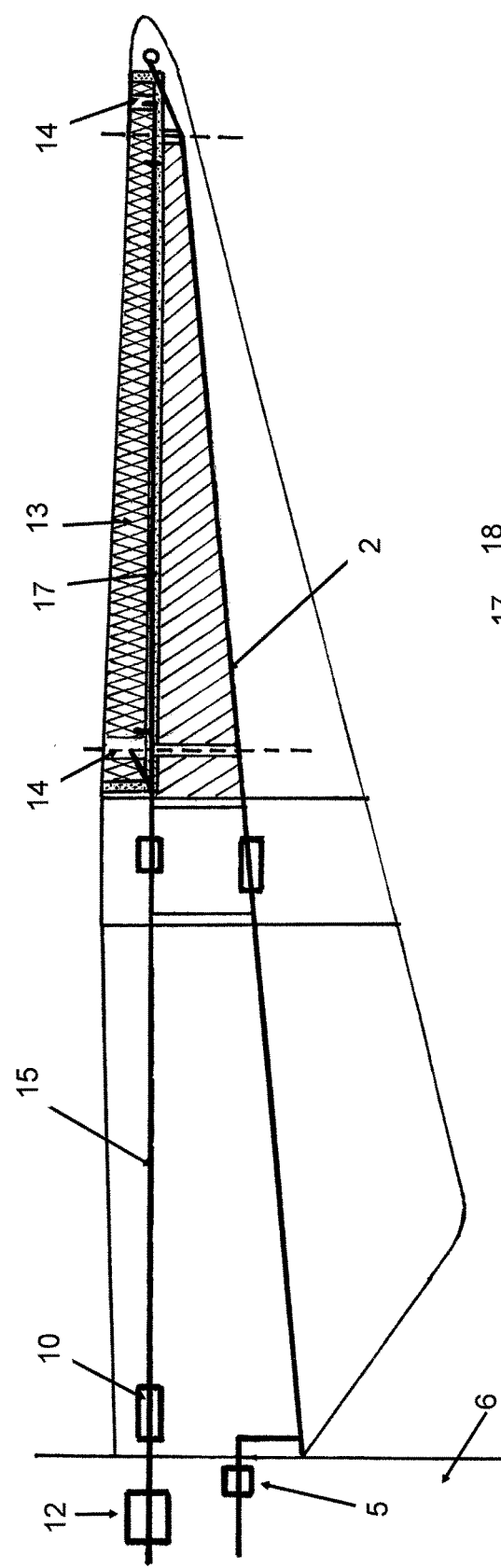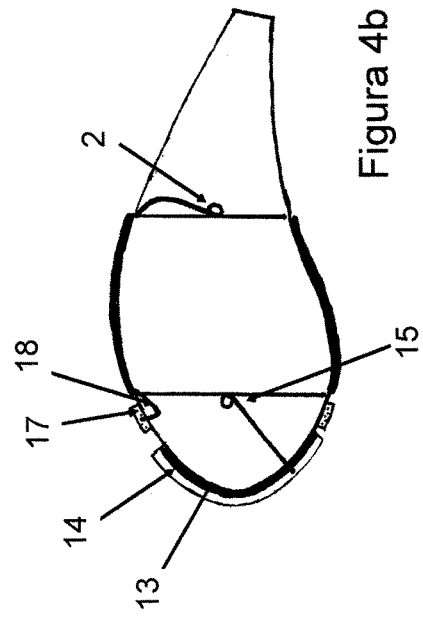
Figura 4a
Figura 4b

LIGHTNING PROTECTION SYSTEM WITH INTEGRATED ANTI-ICING SYSTEM FOR WIND TURBINE BLADES

FIELD OF THE INVENTION

The present invention refers to a lightning protection system for blades on wind turbine located in low-temperature sites and equipped with systems for preventing the formation of ice on the blade surface.

BACKGROUND OF THE INVENTION

Given the heights that wind turbines can reach and their siting in elevated zones surrounded by no elements of similar height, there is an elevated risk of being struck by lightning, especially for the blades. For this reason, blades should be equipped with a lightning protection system, and any additional system installed on the blade containing conductive elements (metal pieces, sensors, beacon systems, etc.) should be protected against direct lightning strikes and the indirect effects of the electromagnetic field induced by lightning bolts.

When the wind turbine is sited in a low-temperature area, ice formations on blade surfaces could reduce their effectiveness as it compromises their aerodynamic properties and increases the loads on the wind turbine. The formation of ice is forestalled with prevention systems based on either the injection of hot air inside the blade, as described in patent DE 19621485, or by installing conductive sheets onto the external laminates of the blade to act as resistors.

These ice formation prevention systems (hereinafter referred to as IPS) are based on conductive metal or carbon fiber sheets embedded into the external laminate of the wind turbine blade, generally on the leading edge, which is the most frequent area of ice formation, and electrically fed through two electrodes with greater conductivity than the sheets installed crosswise or lengthwise onto the ends of the conductive sheet.

The use of an IPS could affect the effectiveness of the lightning protection systems, since the conductive elements that they contain, electrodes, can attract lightning and thus damage not only the blade but also the IPS, or even the electrical power supply systems.

There are known solutions in the State of the Art such as European patent EP 1187988, which describes a deicing and lightning protection system comprising a receptor at the blade tip, three electrical conductors, electrical heating elements and overvoltage cutouts. The cited receptor is connected to the ground at the blade root through one of the electrical conductors while the other two electrical conductors are grounded through the overvoltage cutouts. Nevertheless, this solution has the inconvenience of internal electrical arcing in the zones with no overvoltage cutouts due to the proximity between the IPS and the lightning protection system.

DESCRIPTION OF THE INVENTION

One object of the invention is a lightning protection system (LPS) that guarantees the correction operation of a system for preventing the formation of ice (IPS) integrated into the LPS and comprising conductive sheets embedded into the external laminate of the wind turbine blades.

The integrated IPS determines a series of conductive sheets embedded in the external laminate of the blade and their ends are equipped with some electrodes that have greater conductivity than the conductive sheets.

One object of the invention is that the integrated IPS is equipped with electrodes transversally with a view to obtaining an appropriate thermal distribution.

The conductive sheets determine the type of electrical configuration on the basis of whether they are laid out lengthwise or crosswise in the blade;

In the lengthwise layout, the current is conducted transversally from one of the electrodes (located at some point on the outer blade surface) to the other (located on the inner blade surface).

In the crosswise layout, the current is conducted longitudinally from one of the electrodes (located at a spot on the blade tip) to another (located at a spot on the blade root).

One object of the invention is that the IPS operates as a lightning protection system (LPS) capable of withstanding lightning strikes without comprising its functions.

Another object of the invention is that the system comprises an external frame as a lightning receptor to guarantee galvanic isolation. The frame material will have an elasticity greater than the blade's elasticity so as to preclude plastic deformation. To do so, the incorporation of an external receptor frame is contemplated for the blade surface to encompass the conductive sheets fully or partially and receive lighting strikes directly.

Another object of the invention is that the system comprises a smart protection system that, even in the summer, will disable the heating system and connect the lightning protection system (LPS) on detecting a nearby lightning strike.

Another object of the invention is that the system is equipped with overvoltage dischargers between the IPS and LPS to equipotentialize both systems and preclude electric arcing.

These and other aspects of the invention will be described in more detail with the help of the drawings shown below.

BRIEF DESCRIPTION OF THE DRAWINGS

FIGS. 1a and 1b are schematic views of the electrical configuration of a lightning protection system (LPS) according to the State of the Art.

FIGS. 2a and 2b are schematic views of the electrical configuration of the invention for an LPS equipped with an IPS having conductive sheets laid out crosswise.

FIGS. 3a and 3b are schematic views of the electrical configuration of the invention for an LPS equipped with an IPS having conductive sheets laid out lengthwise.

FIGS. 4a and 4b are schematic views of the electrical configuration of the invention for an LPS equipped with an IPS having an external receptor frame.

DESCRIPTION OF A PREFERENTIAL EMBODIMENT

FIGS. 1a and 1b illustrate a longitudinal cross-section and transversal cross-section, respectively, of a wind turbine blade (1) equipped with an LPS comprising a lightning cable (2) running along the trailing edge web (3) of the beam (4), a connector (5) for the lightning cable (2) to the wind turbine hub (not represented) located at the root (6) of the blade (1), a lightning receptor (7) located on the blade tip (8), two connectors (9) connected electrically to the carbon flange (3) of the beam (4) of the beam (1) and LPS.

The invention, as shown in FIGS. 2a, 2b, 3a, 3b, 4a and 4b, describes a lightning protection system (LPS) comprising a smart protection system (10), an integrated IPS and overvoltage dischargers (11).

The smart protection system (10) enables system operation in heating or lightning protection mode to disable the heating mode and enable the lightning protection mode even during the summer or whenever detecting a lightning strike.

The system of the invention likewise comprises a connection box (12) to act as a fuse to prevent wind turbine damage should the intelligent protection system (10) fail to detect the lightning strike.

The IPS, integrated in the LPS of the invention, determines some conductive sheets (13) embedded in the laminate of the blade (1) and serves as a lightning receptor. The conductive sheets (13) could have a crosswise or lengthwise layout (see FIGS. 2a, 2b, 3a, 3b), and some electrodes (14) are connected through some power supply cables (15) from the IPS to the smart protection system (10) located at the blade root (6).

Thus, when the protection system (10) switches from heating to lightning protection mode, the power supply cables (15) for the conductive sheets (13) connect with the downlead cable (2) of the lightning protection system (LPS) and the power supply cables (15) of the conductive sheets (13) disconnect from the electrical power supply system at the blade root (6).

According one preferential embodiment of the invention, the conductive sheets (13) of the IPS are mounted crosswise, creating an overlap in the area of the blade leading edge (16), thus guaranteeing that a higher temperature can be reached in the most necessary area and increasing the effectiveness of the system.

Regardless of the direction in which the conductive sheets (13) of the conductive sheet are laid out, the electrodes (14) are wired to the connection box (12) located at the wind turbine blade root (6).

The voltage dischargers (11) are located between the conductive sheets (13) of the IPS and downlead cable (2) of the lightning protection system (LPS) to ensure the equipotentiality of both systems and prevent electric arcs.

FIGS. 3a and 3b illustrate an embodiment of the system of the present invention in which the electrodes (14) on the conductive sheets (13) of the IPS run longitudinally, conducting current transversally from one of the electrodes (14) on the outer blade surface (1) to another electrode (14) on the inner blade surface (1).

FIGS. 2a and 2b illustrate another embodiment of the system of the present invention in which the electrodes (14) are laid out transversally and the current runs from one of the electrodes (14) on the tip (8) of the blade (1) to another electrode (14) located toward the root (6) of the blade (1).

Further, the invention contemplates the incorporation of an external receptor frame (17) as shown in FIGS. 4a and 4b. The external receptor frame (17) is connected (18) directly to the downlead cable (2) of the lightning protection system to preclude direct strikes onto the conductive sheets (13) of the IPS that it covers fully or partially. The frame (17) is mounted leaving a gap between the carbon conductive sheets (13) and the frame itself (17) so as to provide galvanic isolation.

While this invention has been described entirely in connection with preferential embodiments, modifications may clearly be made within its scope, which is not restricted by the aforementioned embodiments, but rather by the content of the following claims.

The invention claimed is:

1. A lightning protection system with an integrated anti-icing system for wind turbine blades comprising one or various conductive sheets (13) embedded in the laminate of a blade (1) and equipped with electrodes (14) fed from a root (6) of the blade (1) through power supply cables (15), wherein the lightning protection system (LPS) comprises:
   at least one receptor (7) connected to a downlead cable (2) grounded at the blade root (6), and
   a protection system (10) that enables system operation in a heating mode or a lightning protection mode to disable the heating mode and enable the lightning protection mode whenever detecting a lightning strike, wherein at least one overvoltage discharger (11) directly connects the electrodes (14) connected to the conductive sheets (13) to the downlead cable (2) of the lightning protection system.

2. Lightning protection system with an integrated anti-icing system for wind turbine blades according to claim 1, wherein the conductive sheets (13) are embedded longitudinally in the blade laminate (1).

3. Lightning protection system with an integrated anti-icing system for wind turbine blades according to claim 1 wherein the conductive sheets (13) are embedded transversally in the blade laminate (1).

4. Lightning protection system with an integrated anti-icing system for wind turbine blades according to claim 1, comprising an external receptor frame (17) on the blade surface (1) that encompasses the conductive sheets (13) either fully or partially and is connected directly to the downlead cable (2) of the lightning protection system.

5. Lightning protection system for wind turbine blades with anti-icing systems according to claim 4, wherein the external receptor frame (17) is mounted leaving a gap between the conductive sheets (13) and the external receptor frame (17).

6. Lightning protection system with an integrated anti-icing system for wind turbine blades according to claim 1, wherein the protection system (10) is located at the blade root (6) and is configured to:
   modify the operation of the system on detection of a nearby lightning strike,
   switch from the heating mode to the lightning protection mode,
   connect the power supply cables (15) of the conductive sheets (13) and the downlead cable (2) of the lightning protection system, and
   disconnect the power supply cables (15) of the conductive sheets (13) from the electrical power supply at the root (6) of the blade (1) and connecting the power supply cables (15) to the downlead cable (2) of the lightning protection system.

7. Lightning protection system with an integrated anti-icing system for wind turbine blades according to claim 6 comprising a connection box (12) that operates as a fuse if the smart protection system (10) fails to detect a lightning strike.

* * * * *